Dec. 16, 1969   E. A. CHANDLER ET AL   3,483,581
ADHESIVE PROCESSES
Filed March 26, 1968

*Inventors*
Edmond A. Chandler
Kenelm W. Winslow
By their Attorney
Benjamin C. Pollard United States Patent Office 3,483,581
Patented Dec. 16, 1969

3,483,581
ADHESIVE PROCESSES
Edmond A. Chandler and Kenelm W. Winslow, Chestnut Hill, Mass., assignors to USM Corporation, Flemington, N.J., a corporation of New York
Filed Mar. 26, 1968, Ser. No. 716,053
Int. Cl. A43d 25/00
U.S. Cl. 12—142                                7 Claims

ABSTRACT OF THE DISCLOSURE

Process for joining thick elements adhesively and particularly for attaching a tread member to a shoe comprising the steps of disposing on an attaching surface a thin open coherent sheet of thermoplastic synthetic polymeric resin adhesive strands, heating the sheet and the attaching surfaces to a temperature above the activation temperature of the thermoplastic adhesive, bringing the surfaces together while so heated with the adhesive sheet between them, exerting pressure on the elements to force the adhesive of the sheet into intimate engagement with the attaching surfaces and cooling the assembly to establish rapidly a strong adhesive union.

This invention relates to a process for joining thick elements adhesively and particularly for the adhesive attachment of tread members to shoe uppers.

In the U.S. Patent of Conrad Rossitto No. 3,168,574 which issued February 9, 1965, there is disclosed a process for sole attaching in which a band of molten thermoplastic synthetic polymeric resin adhesive is applied to the attaching surface of the outsole, the outsole with the adhesive thereon and the bottom of the shoe upper are heated and the outsole and upper are assembled and pressed together to establish an adhesive bond which provides a strong union between outsole and upper when the assembly is cooled. Excellent bonds between sole and shoe upper are obtained; but the process requires the separate steps of applying molten adhesive to the tread member and cooling the adhesive prior to the step of heat activating of the applied adhesive. Also because of irregularities in soles and because of machine and other requirements a band of adhesive of substantial thickness has been required.

It is an object of the present invention to provide a process for joining thick elements adhesively and particularly for attaching tread members to shoes, using thermoplastic synthetic polymeric resin adhesive but eliminating the separate step of applying a band of molten adhesive.

It is a further object of the invention to provide a process for attaching tread members using a very much smaller quantity of thermoplastic resin adhesive than required by hitherto known processes.

To these ends and in accordance with a feature of the present invention there is provided an adhesive process for joining surfaces in which a coherent adhesive open sheet of thin interconnected strands is disposed on an attaching surface and the bond is completed by heating the adhesive sheet and both attaching surfaces and pressing the attaching surfaces together with the adhesive sheet between them. On cooling this assembly a strong bond is obtained.

The invention will be described further in connection with the attached drawings forming part of the disclosure of the present case in which.

The present process is useful in a variety of relations for attaching relatively thick elements, i.e. elements through which it is difficult to supply heat for activating adhesive, and particularly for bonding tread elements to the attaching surfaces of shoe elements. Thus, the process may be used to secure outsoles to shoe bottoms, to secure heels to heel attaching surfaces either of outsoles or of shoe uppers and in other relationships. The bonding of outsoles to shoe uppers in a particularly difficult problem because of the stresses involved in use and the following description will refer to bonding of outsoles to shoe uppers. It is to be understood, however, that the process is not limited to this application of the invention.

Figure 1:
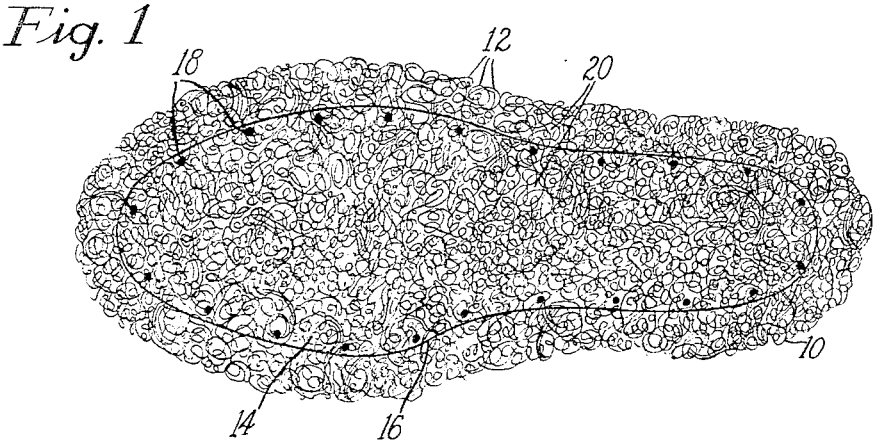
FIG. 1 is a diagrammatic plan view of an outsole with preformed sheet adhesive located in position to overlie the attaching margins.
Figure 2:
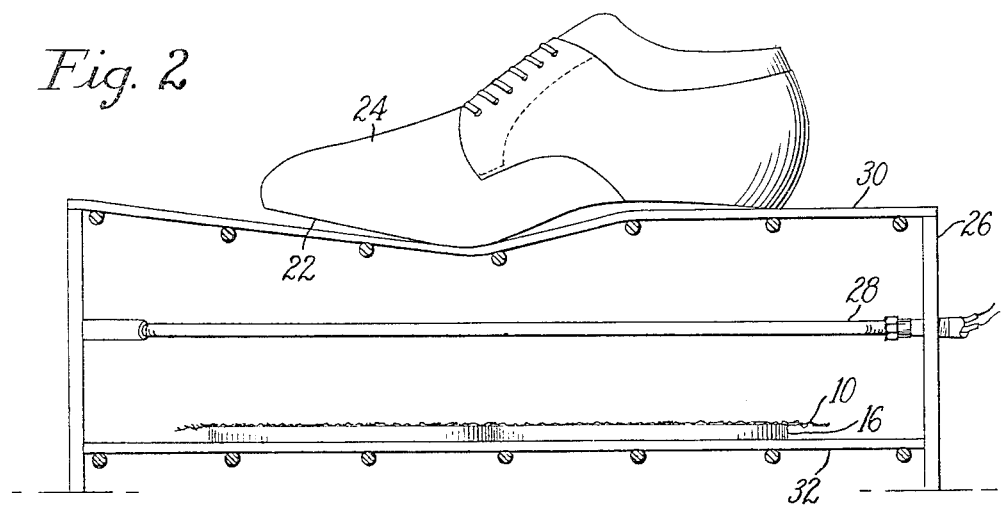
FIG. 2 is a diagrammatic elevational view showing heating of the sheet of adhesive, the attaching surface of the outsole and the attaching surface at the bottom of a shoe upper.
Figure 3:
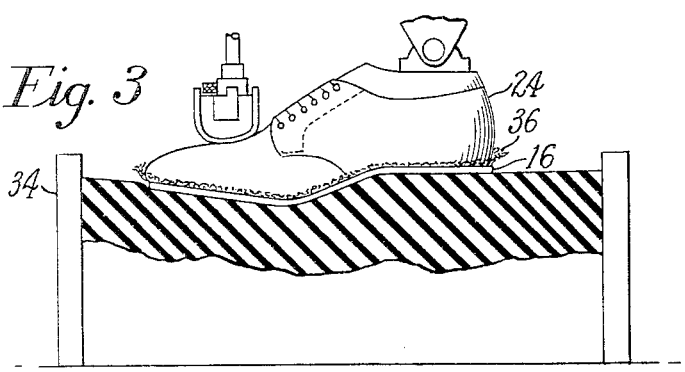
FIG. 3 is a diagrammatic elevational view showing the bonding of the outsole to the upper in a sole attaching press.

In the attaching of outsoles to shoe uppers in accordance with the process of the present invention a thin, coherent open sheet 10 of thin interconnected strands 12 of adhesive is disposed in position to cover the attaching surface portions 14 of an outsole 16 as shown in FIG. 1. The term "open sheet" refers to the fact that in a given area of the sheet 10 a substantial proportion, for example, at least about 25% and preferably 40% or more of the overall space is void. The sheet may be secured to the outsole by separately applied adhesive, e.g. deposits of pressure-sensitive adhesive on the surface of the outsole, or by mechanical means or may be simply held in place during subsequent steps of the process. In a preferred form attaching points 18 to hold the sheet 10 in place have been formed by pressing a heated member against the sheet to melt it and establish adhesive engagement with the attaching surface so that the sheet is self-adhered to the surface. While use of a thin sheet which covers the entire attaching surface 14 of the outsole 16 is shown in the drawing, it will be understood that it is only necessary that the sheet adhesive 10 overlie the marginal portions of the attaching surface since the effect of adhesive at central portions of many shoe constructions is of little assistance in holding the outsole to a shoe upper.

An adhesive sheet 10 useful in the method of the present invention may be a network of very small cross section interconnected strands such as fine fibers or filaments 12 of thermoplastic adhesive material with substantial open spaces between the elements. The fibers 12 may be in woven or nonwoven relationship. A particularly satisfactory nonwoven sheet 10 is formed from substantially continuous fibers laid down in crossing relationship with the fibers joined to each other at the points of intersection to form a coherent readily handled sheet. The fibers should be at least about .002″ in thickness for use in attaching tread members and preferably are from about .003″ to about .010″ in thickness. It is important that the sheet 10 be free from large gaps and ordinarily the gaps 20 between fibers should not exceed $3/16″$ and preferably not exceed $1/8″$. For attaching tread members, the sheet 10 should provide a quantity of adhesive corresponding to at least about 30 grams per square yard, preferably from 40 to 80 grams per square yard and this quantity of adhesive may be made up either as a single layer or as two or more layers.

As an alternative adhesive sheet 10, there may also be used a thin unitary open sheet of thermoplastic polymeric resin adhesive formed with openings outlined by interconnected thin strands or substantially line contact elements, provided the total amount of adhesive is at least 30 grams and preferably 40 to 80 grams per square yard. Such an open sheet of adhesive may be secured to the bottom 22 of the shoe upper 14 by the same procedures useful with the adhesive fiber sheet, i.e.

adhesively or mechanically. However, the unitary sheet lacks the ability to compress or stretch easily in the plane of the sheet so that it is less readily laid down in a curving path to follow the outline of the shoe than is the fiber sheet.

As the adhesive of which the sheet is formed, it is preferred to use high molecular weight thermoplastic synthetic polymer resins, for example, relatively high molecular weight polyesters, polyamides, polyesteramides, and thermoplastic polyester glycol urethanes or polyether glycol urethanes. Other normally solid thermoplastic resinous materials capable of melting to a condition for wetting and adhering to shoe upper materials and of hardening to provide a strong bond may be used. Preferred adhesives for attaching tread members may have melting points in the range of from about 80° C. to about 200° C. and will harden to a strong tough condition at a temperature of at least about 50° C.

The next step of the process involves heating the attaching surface 14 of the outsole 16, the attaching surface 22 of a shoe upper 24 and the adhesive sheet 10. Various types of heating may be employed such as a stream of hot gas or high frequency electric or magnetic fields; but radiant heating has been found particularly satisfactory. Heating may be achieved as shown in the drawing using a heating device 26 including a radiant heating element 28 with racks 30 and 32 respectively, disposed above and below it. The radiant heating element 28 not only heats the adhesive sheet 10, but, because of the large portion of openness in the sheet is effective also to raise the temperature of the attaching surface 14 of the outsole 16 underlying the sheet. Thus, the heating action brings the attaching surface 22 of the bottom of the shoe upper, the adhesive sheet 10 and the attaching surface 14 of the outsole to temperatures at which the adhesive can wet and adhere to the heated attaching surfaces to hold them together. For example, with a sheet of which the adhesive has a melting point of 280° F., this heating may involve exposure to an infrared heater at a space of 3" for a period of about 15 seconds. The extent of heating is not particularly critical and is readily determined for any selected adhesive sheet. It is desirable to keep the temperature at a minimum consistent with activation of the adhesive to minimize the in-press time.

After the attaching surface 22 of the upper 24, the adhesive sheet 10, and the attaching surface 14 of the outsole 16 have been heated, the sole 16 and upper 24 are removed from the heating device 26 and assembled promptly while the temperatures of the adhesive and the attaching surfaces of the sole and upper are sufficient to secure the wetting and adhesive action, and the assembly is, without delay, placed in a sole attaching press 34 and subjected to sole attaching pressure. Pressure in the sole attaching press may be released in a matter of only a few seconds and the adhesive will hold the outsole 16 firmly on the shoe upper 24 after release of pressure. Thereafter exposed portions 36 of the adhesive sheet may be trimmed off.

Although by proper selection of the adhesive or adhesive mixture of the adhesive sheet, natural or synthetic rubber outsole materials may be bonded as well as leather outsoles, it is also possible to employ a wider range of adhesives through providing a primer coat on the attaching surface of the outsole. Primers for natural or synthetic rubber base outsoles which may be used include, for example, a volatile organic solvent solution of neoprene and chlorinated rubber or a volatile organic solvent solution of a polyester resin and a vinyl chloride, vinyl acetate copolymer resin.

The following examples are given as of assistance in understanding the invention. It is to be understood that the invention is not limited to the particular procedures, materials or conditions employed in the examples.

EXAMPLE I

A crystallizable copolyester resin from condensation and polymerization of a 5.0:4.1:0.9 mol ratio mixture of terephthalic acid, isophthalic acid and dibutyl sebacate with 1,4 butane diol having a melting point of about 280° F. was melted and extruded from a plurality of spinnerettes as filaments about .009 inch in diameter. The filaments were deposited on a moving carrier in crossing relationship to form a web with the filaments adhered to each other at crossing points. The rate of extrusion and the speed of the carrier were correlated so that the web had a weight per square yard of about 70 grams and an openness such that in excess of 50% of the area of the web was void. On cooling, the web was slit to form strips of about one inch in width.

The attaching surfaces of a commercial butadiene-styrene copolymer based composition outsole were given a primer coat of a solution of neoprene and chlorinated rubber in a volatile organic solvent and dried. Strips of the web were secured in position to overlie the primed surfaces by spots of pressure-sensitive adhesive on the outsole. The outsole was disposed with the surface carrying the adhesive web exposed to a radiant heat source for 10 seconds. This radiant heat raised the surface temperature of the outsole to about 260° F. and raised the temperature of the adhesive of the web to an extent that the adhesive became sufficiently fluid to wet the surface of the outsole.

At the same time the bottom of a leather shoe upper was exposed to radiant heat to raise the temperature of the attaching surface of the shoe upper to about 150° F. The outsole was then spotted on the upper and the assembly placed in a sole attaching press. Pressure was applied to the extent of 50 lbs. per sq. inch pressure on the assembly and after 6 seconds the pressure was removed. On examination it was found that the sole was strongly attached to the shoe upper and that the edges of the sole were very tight to the upper. Projecting portions of the web were removed with the aid of a hot knife.

EXAMPLE II

Strips of web prepared as in Example I were secured in position to overlie the attaching surfaces of a leather outsole using a heated tool to fuse and self-adhere the adhesive of the web to the surface of the outsole. The surface of the outsole carrying the adhesive web was exposed to a radiant heat source for 15 seconds which both heated the surface of the outsole and raised the temperature of the adhesive of the web to an extent that the adhesive became sufficiently fluid to wet the surface of the outsole.

At the same time the bottom of a leather shoe upper was exposed to radiant heat to raise the temperature of its attaching surface to about 160° F. The outsole was then spotted on the upper and the assembly placed in a sole attaching press. Pressure was applied to the extent of 50 lbs. per sq. inch pressure on the assembly and after 10 seconds the pressure was removed. On examination it was found that the sole was strongly attached to the shoe upper and that the edges of the sole were very tight to the upper. Projecting portions of the web were removed with the aid of a hot knife.

Having thus described our invention what we claim as new and desire to secure by Letters Patent of the United States is:

1. The process of joining adhesively the attaching surfaces of two bodies of substantial thickness comprising the steps of laying on one of the attaching surfaces to be joined a coherent open sheet formed of interconnected thin strands of thermoplastic synthetic polymeric resin adhesive outlining openings with portions of said one attaching surface exposed through said openings in said sheet, said sheet having an open area of at least about 25% of the overall area of said sheet, heating said sheet to bring the adhesive to active condition, supplying heat through said openings to said exposed portions of said one attaching surface, heating the other attaching surface, bringing said surfaces together while so heated with the activated adhesive sheet between them, pressing said bodies together to force the adhesive of the sheet into intimate engagement with said surfaces and cooling said assembly to establish rapidly a strong adhesive union between the surfaces.

2. The process of joining adhesively the surfaces of two bodies as defined in claim 1 in which the sheet and the surfaces to be joined are heated by radiant heat.

3. The process of adhesively joining bodies as defined in claim 2 in which one of the surfaces is a shoe bottom and in which the other surface is the attaching surface of a tread member and in which the adhesive sheet provides a quantity of adhesive of at least about 30 grams per square yard.

4. The process of joining bodies adhesively as defined in claim 3 in which said sheet is a web of fibers of said adhesive, said fibers being held in crossing relation to each other to constitute a coherent open sheet.

5. The process of joining bodies adhesively as defined in claim 4 in which said sheet is a nonwoven web of fibers of said adhesive and said fibers are self-adhered to adjacent fibers at points of intersection.

6. The process of joining bodies adhesively as defined in claim 4 in which said sheet is adhesively secured to one of said surfaces before bringing said surfaces together.

7. The process of joining bodies adhesively as defined in claim 6 in which said adhesive sheet is self-adhered to one of said surfaces by applying heat and pressure to force portions of said sheet into adhesive engagement with said surface.

References Cited

UNITED STATES PATENTS

| | | | |
|---|---|---|---|
| 2,196,856 | 4/1940 | Dudenhofen | 12—142 |
| 3,278,959 | 10/1966 | Nardone | 12—142 |
| 3,315,287 | 4/1967 | Davis | 12—142 |

PATRICK D. LAWSON, Primary Examiner